US011642742B2

(12) United States Patent
Liu

(10) Patent No.: US 11,642,742 B2
(45) Date of Patent: May 9, 2023

(54) LASER PIPE CUTTING DEVICE

(71) Applicant: HSG LASER CO., LTD., Guangdong (CN)

(72) Inventor: Yang Liu, Guangdong (CN)

(73) Assignee: HSG LASER CO., LTD., Foshan (CN)

( * ) Notice: Subject to any disclaimer, the term of this patent is extended or adjusted under 35 U.S.C. 154(b) by 0 days.

(21) Appl. No.: 17/863,423

(22) Filed: Jul. 13, 2022

(65) Prior Publication Data

US 2023/0040145 A1 Feb. 9, 2023

(30) Foreign Application Priority Data

Aug. 3, 2021 (CN) .......................... 202110887123.1

(51) Int. Cl.
*B23K 26/38* (2014.01)
*B23K 101/06* (2006.01)

(52) U.S. Cl.
CPC .......... *B23K 26/38* (2013.01); *B23K 2101/06* (2018.08)

(58) Field of Classification Search
CPC ............................ B23K 26/38; B23K 2101/06
USPC .......................... 219/121.85, 121.67, 121.72
See application file for complete search history.

(56) References Cited

U.S. PATENT DOCUMENTS

| 5,744,778 | A | * | 4/1998 | Kash | .................. | B23K 37/0533 82/127 |
| 5,980,191 | A | * | 11/1999 | Trible | ................ | B23K 37/0533 414/746.7 |
| 5,994,667 | A | * | 11/1999 | Merdan | .................. | B23K 26/18 219/121.7 |
| 6,403,916 | B1 | * | 6/2002 | Spooner | ............. | B23K 26/0619 219/121.76 |
| 6,483,075 | B1 | * | 11/2002 | Yamazaki | .......... | B23K 37/0538 219/121.6 |
| 9,302,353 | B2 | * | 4/2016 | Brandstrom | ....... | B23K 37/0533 |
| 2002/0179581 | A1 | * | 12/2002 | Inoue | ...................... | C21D 1/09 219/121.81 |

(Continued)

FOREIGN PATENT DOCUMENTS

| CN | 207534183 U | 6/2018 |
| CN | 108747055 A | 11/2018 |

(Continued)

OTHER PUBLICATIONS

Notice of Allowance of counterpart Chinese Patent Application No. 202110887123.1 dated Nov. 1, 2021.

(Continued)

*Primary Examiner* — Jimmy Chou

(57) ABSTRACT

A laser pipe cutting device is provided. It includes a cutting head, a lathe bed, a first chuck, a second chuck and a third chuck; the first chuck is a fixed chuck for positioning axially and radially a pipe fitting; the second chuck is a rolling chuck for positioning radially the pipe fitting; and a fixed clamping disc and a rolling clamping disc are arranged on the third chuck at both ends. In the scheme, the third chuck integrates both the rolling clamping function and the fixed clamping function to achieve larger supporting weight and more accurate clamping precision, so that the chucks can drive a thin pipe fitting to rotate at a higher speed, the cutting efficiency is improved, and no-dead-angle and zero-tailing cutting is achieved.

16 Claims, 4 Drawing Sheets

(56) References Cited

U.S. PATENT DOCUMENTS

| | | | | |
|---|---|---|---|---|
| 2003/0234242 | A1* | 12/2003 | McCoy | B23K 26/0823 |
| | | | | 219/121.82 |
| 2003/0234244 | A1* | 12/2003 | McCoy | B23K 26/146 |
| | | | | 219/121.72 |
| 2004/0024485 | A1* | 2/2004 | McCoy | B23K 26/0823 |
| | | | | 219/121.72 |
| 2008/0121628 | A1* | 5/2008 | Yamazaki | B23K 37/0533 |
| | | | | 219/121.82 |
| 2008/0135531 | A1* | 6/2008 | Widmann | B23K 26/38 |
| | | | | 219/121.72 |
| 2008/0302769 | A1* | 12/2008 | Yamazaki | B23K 26/0846 |
| | | | | 219/121.67 |
| 2011/0253686 | A1* | 10/2011 | Keel | B23K 37/0426 |
| | | | | 29/401.1 |
| 2013/0020295 | A1* | 1/2013 | Schopf | B23K 37/00 |
| | | | | 219/121.72 |
| 2013/0193125 | A1* | 8/2013 | Nishiyama | B23K 37/0235 |
| | | | | 219/121.85 |
| 2016/0271702 | A1* | 9/2016 | Karpachevskyy | B23B 3/26 |
| 2017/0021461 | A1* | 1/2017 | Hamacher | B23D 21/003 |
| 2019/0063908 | A1* | 2/2019 | Chang | G01N 21/8901 |
| 2020/0398384 | A1* | 12/2020 | Wang | B23Q 3/064 |
| 2021/0371323 | A1* | 12/2021 | Shi | B23K 26/02 |

FOREIGN PATENT DOCUMENTS

| | | | | |
|---|---|---|---|---|
| CN | 109175730 | A | | 1/2019 |
| CN | 109746511 | A | | 5/2019 |
| CN | 110421277 | A | | 11/2019 |
| CN | 110802334 | A | | 2/2020 |
| CN | 110814414 | A | | 2/2020 |
| CN | 210099385 | U | | 2/2020 |
| CN | 111215760 | A | | 6/2020 |
| CN | 211465199 | U | | 9/2020 |
| CN | 211680547 | U | | 10/2020 |
| CN | 211759238 | U | | 10/2020 |
| CN | 112191875 | A * | 1/2021 | B23B 31/12 |
| CN | 112191875 | A | | 1/2021 |
| CN | 212350800 | U | | 1/2021 |
| CN | 112917021 | A | | 6/2021 |
| CN | 306668828 | S | | 7/2021 |

OTHER PUBLICATIONS

2nd Office Action of counterpart Chinese Patent Application No. 202110887123.1 dated Oct. 12, 2021.

* cited by examiner

LASER PIPE CUTTING DEVICE

CROSS REFERENCE TO RELATED APPLICATIONS

The present application claims the benefit of Chinese Patent Application No. 202110887123.1 filed on Aug. 3, 2021, the contents of which are incorporated herein by reference in their entirety.

FIELD OF THE INVENTION

The present invention belongs to the technical field of laser cutting, and more particularly, relates to a laser pipe cutting device.

BACKGROUND OF THE INVENTION

At present, according to the number of chucks, laser pipe cutting devices can be divided into a two-chuck pipe cutting device, a three-chuck pipe cutting device and a four-chuck pipe cutting device which are each provided with at least one fixed chuck for fixed clamping and feeding of a pipe and at least one rolling chuck for pipe centering and rotating.

The two-chuck pipe cutting device includes a fixed chuck and a rolling chuck and is simple in structure and easy to operate, but due to fewer clamping points, long materials cannot cut or discharged; the three-chuck device is composed of two fixed chucks and one rolling chuck or composed of one fixed chuck and two rolling chucks, and supports larger weight and more accurate cutting, but when the length of a pipe is slightly larger than the thickness of the middle rolling chuck, a patterning cutting cannot be made on the pipe, and consequently, the pipe has to be cut off, and when the length of the pipe is lower than the sum of the thicknesses of the two rolling chucks, a cross-section surface cannot be cut out, and when a cutting head goes offside to the tail of the pipe for cutting, a patterning cutting of the pipe tailings cannot be made because the fixed chuck at the tail needs to be loosened at this time, so material waste is serious, and automatic discharging cannot be achieved during offside cutting. The four-chuck pipe cutting device commonly includes two fixed chucks and two rolling chucks, that is, two double-chuck structures with a mirror-image setting in which cutting head cannot achieve offside cutting. Although a four-chuck laser pipe cutting machine disclosed in Chinese patent CN111215760A can achieve zero-tailing cutting, simultaneous feeding and discharging and more accurate cutting precision, which results in a longer lathe bed, a lower load bearing capacity due to the fact that only two chucks bear loads, a larger footprint, in addition to a simultaneous and more complex control of four chucks rotating and feeding.

SUMMARY OF THE INVENTION

The present invention provides a laser pipe cutting device for overcoming at least one defect in the prior art, and the laser pipe cutting device can reduce the length of a lathe bed, meanwhile, improve load bearing and achieve lower energy consumption and more simple control.

A technical scheme adopted in the present invention for solving the above technical problems is as follows:

the laser pipe cutting device is provided and includes a cutting head, a lathe bed, a first chuck, a second chuck and a third chuck, wherein the first chuck, the second chuck and the third chuck are sequentially arranged on the lathe bed in a sliding manner; the first chuck is a fixed chuck for positioning axially and radially a pipe fitting; the second chuck is a rolling chuck for positioning radially the pipe fitting; and a fixed clamping disc close to the second chuck for positioning the pipe fitting axially and radially and a rolling clamping disc away from the second chuck for positioning radially the pipe fitting are arranged on the third chuck at both ends.

The third chuck in the scheme integrates both the fixed clamping function and the rolling clamping function which reduces the length of the lathe bed as much as possible, and during pipe cutting, the second chuck and the third chuck can continuously provide three-point supporting, thus providing larger supporting weight and higher supporting precision, so that higher efficiency and precision are achieved when a long and thin pipe fitting is cut.

As a further improved structure form, the third chuck includes a mounting base which is in sliding connection with the lathe bed, a first mounting disc and a second mounting disc which are rotationally arranged at both ends of the mounting base respectively, wherein the first mounting disc on which the fixed clamping disc is arranged is connected fixedly to the second mounting disc on which the rolling clamping disc is arranged, and the third chuck further includes a first driving structure connected with and for driving the first mounting disc or the second mounting disc to rotate.

As a further improved structure form, the first mounting disc, the second mounting disc, the first chuck, the second chuck, the fixed clamping disc and the rolling clamping disc are coaxially arranged.

As a further improved structure form, the fixed clamping disc includes at least two first clamping jaws which are evenly distributed in the circumferential direction of the first mounting disc and arranged on the first mounting disc radially in a sliding manner, and a second driving structure connected with the respective first clamping jaws, and clamping planes are arranged at the ends, close to the rotating axis of the first mounting disc, of the first clamping jaws; and the rolling clamping disc includes at least two second clamping jaws which are evenly distributed in the circumferential direction of the second mounting disc and arranged on the second mounting disc radially in a sliding manner, and a third driving structure connected with the second clamping jaws, and rolling shafts are rotationally arranged at the ends, close to the axis of the second mounting disc, of the second clamping jaws.

As a further improved structure form, the rotating axis of each rolling shaft is perpendicular to the axis of the second mounting disc.

As a further improved structure form, the third chuck further includes a second driving structure connected with the first clamping jaws and for driving the first clamping jaws to move in the radial direction of the first mounting disc, and a third driving structure connected with the second clamping jaws and for driving the second clamping jaws to move in the radial direction of the second mounting disc.

As a further improved structure form, each clamping plane is covered with an anti-skid structure.

As a further improved structure form, a guide rail in sliding connection with the lathe bed, and the first chuck, the second chuck and the mounting base is arranged on the lathe bed along its length direction.

As a further improved structure form, the cutting head further includes a fourth driving structure for driving the cutting head to move in the direction perpendicular to the length direction of the guide rail in a vertical plane, and a fifth driving structure for driving the cutting head to move in the direction perpendicular to the length direction of the guide rail in a horizontal plane.

As a further improved structure form, the third chuck further includes a sixth driving structure arranged on the mounting base and for driving the third chuck to slide in the length direction of the guide rail.

As a further improved structure form, the sixth driving structure includes a rack fixedly arranged on the lathe bed and parallel to the guide rail and a drive motor fixedly arranged on the mounting base, and an output shaft of the drive motor is fixedly mounted with a gear meshing with the rack.

Compared with the prior art, the present invention has the beneficial effects that in the scheme, the third chuck integrates both the rolling clamping function and the fixed clamping function to achieve larger supporting weight and more accurate clamping precision, so that the chucks can drive along and thin pipe fitting to rotate at a higher speed, the cutting efficiency is improved; and in addition, due to the dual clamping function of the third chuck, not only the functions of zero tailing and simultaneous feeding and discharging are achieved, but also the length of the lathe bed is reduced, and therefore the production cost is reduced.

DETAILED DESCRIPTION OF THE INVENTION

Figure 1:
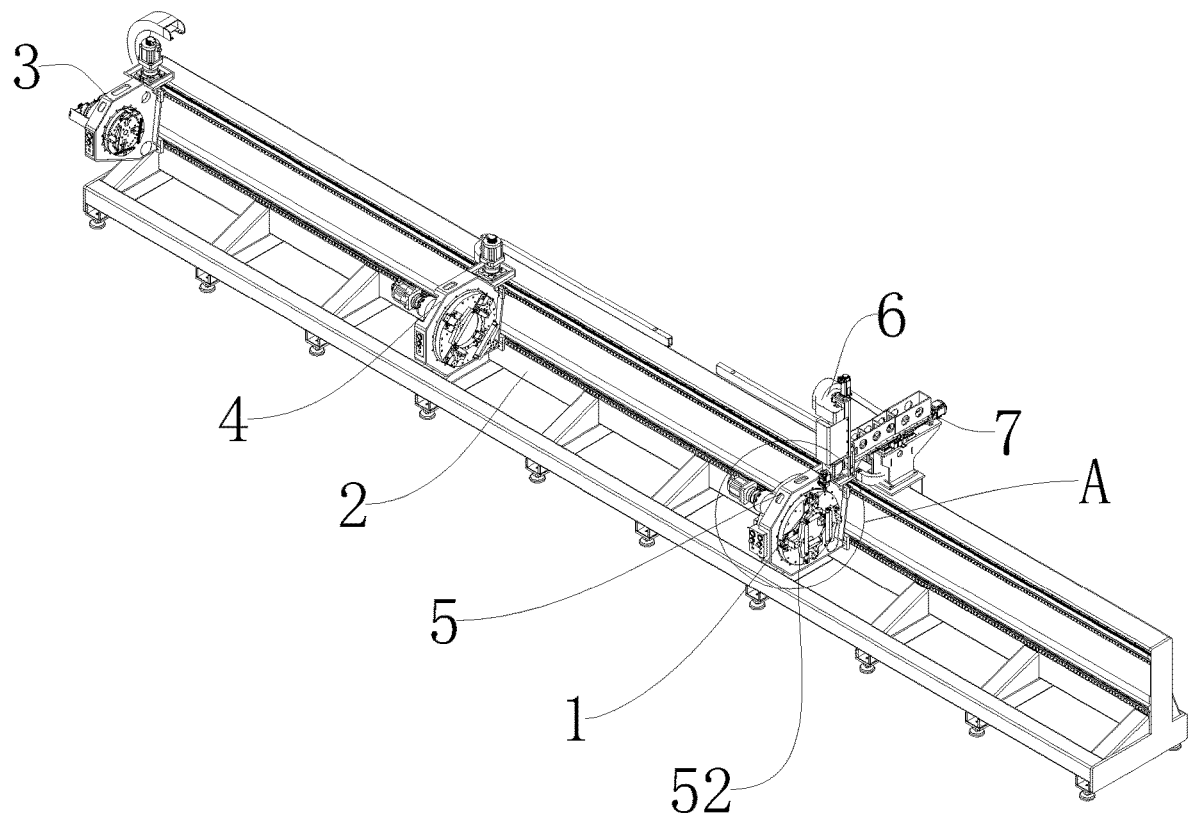
FIG. 1 is a first-angle schematic diagram of an integral structure of a laser pipe cutting device of an embodiment of the present invention.

The drawings are only used for illustrative description but cannot be understood as limitation on the present invention; to better describe the embodiment, some components in the drawings may be omitted, enlarged or zoomed out, which does not represent the actual product size; and for the persons skilled in the art, it is understood that some well-known structures and descriptions thereof in the drawings may be omitted. Positional relationship described in the drawings are only used for illustrative description but cannot be understood as limitation on the present invention.

Same or similar reference numbers in the drawings of the embodiment of the present invention correspond to same or similar parts; and in the description of the present invention, it is understood that directional or positional relationships indicated by the terms "upper", "lower", "left", "right" and the like are directional or positional relationships shown on the basis of the drawings, are only used for conveniently describing the present invention and simplifying the description, but do not indicate or imply that the referenced devices or elements must have particular directions and be constructed and operated in the particular directions, and therefore the terms for describing the positional relationships in the drawings are only used for illustrative description, it should not be understood as limiting the present invention, and those of ordinary skill in the art can understand specific meanings of the above terms according to specific circumstances.

Embodiments

Figure 2:
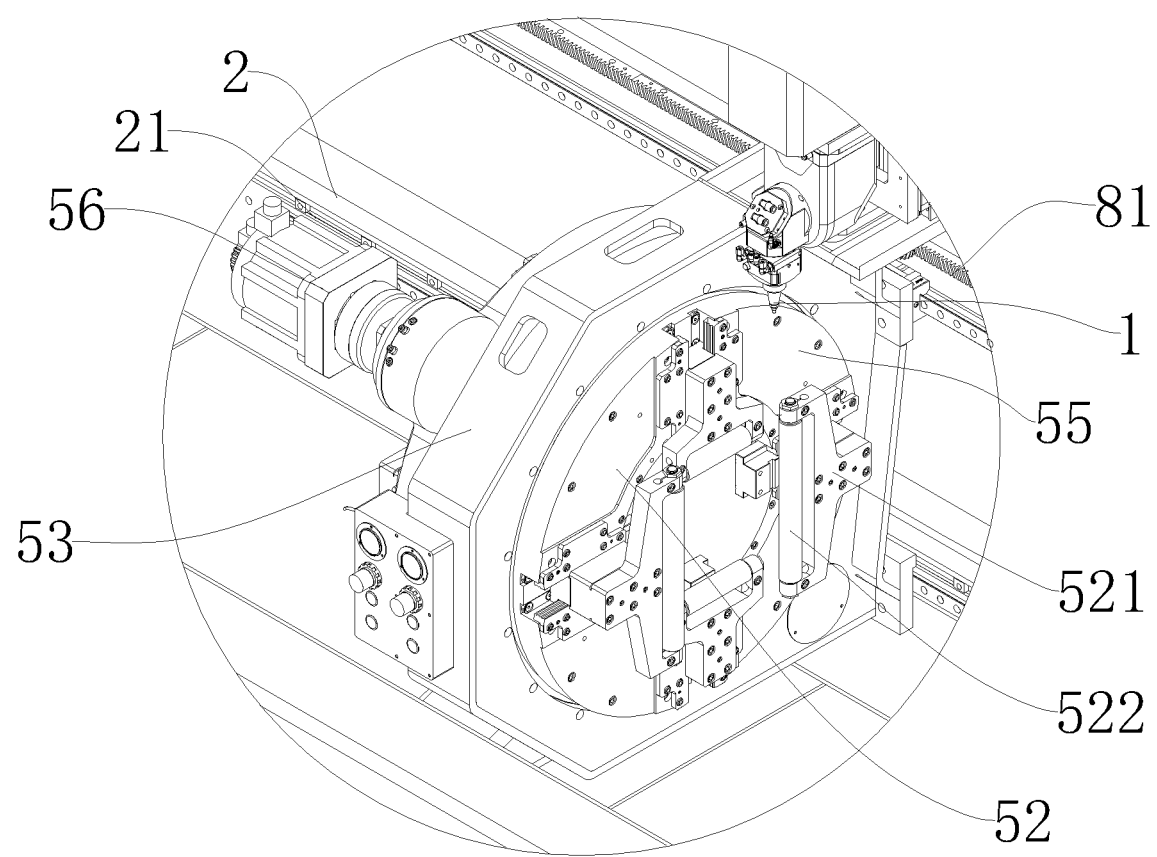
FIG. 2 is an enlarged schematic diagram of a part A in FIG. 1.
Figure 3:
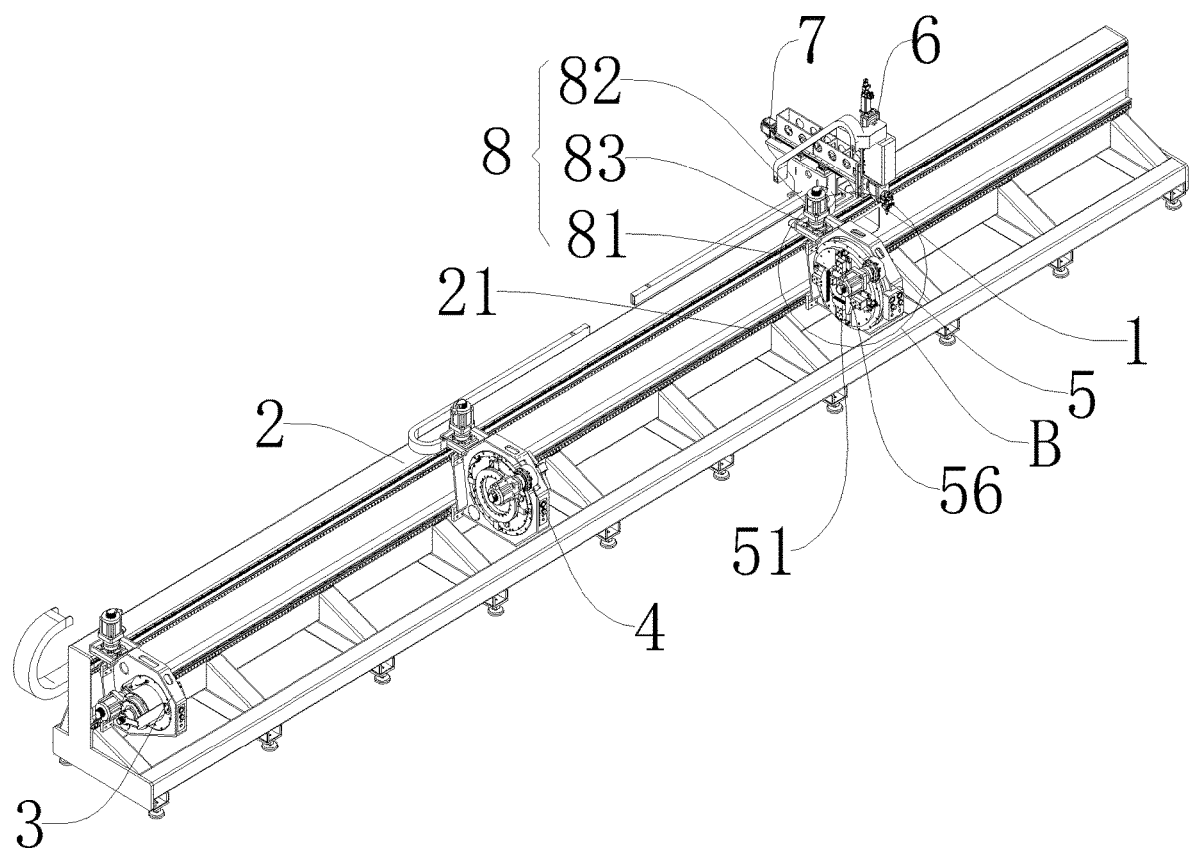
FIG. 3 FIG. 3 is a second-angle schematic diagram of the integral structure of the laser pipe cutting device of the embodiment of the present invention.
Figure 4:
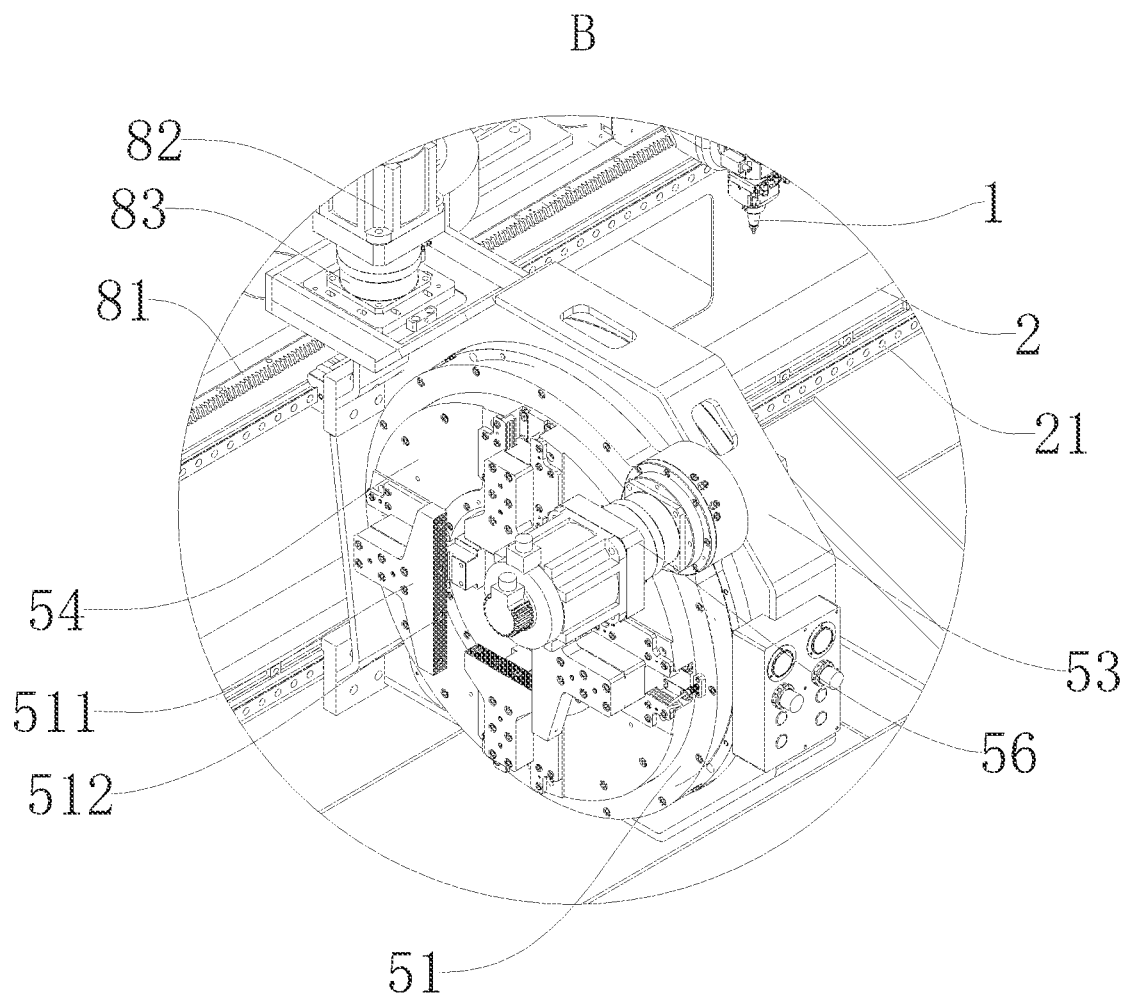
FIG. 4 is an enlarged schematic diagram of a part B in FIG. 3.

FIG. 1-FIG. 4 are the embodiments of one laser pipe cutting device, the laser pipe cutting device includes a cutting head 1, a lathe bed 2, a first chuck 3, a second chuck 4 and a third chuck 5, wherein the first chuck 3, the second chuck 4 and the third chuck 5 are sequentially arranged on the lathe bed 2 in a sliding manner, and the cutting head 1 is in sliding connection with the lathe bed 2; and the first chuck 3 is a fixed chuck for positioning axially and radially a pipe fitting, the second chuck 4 is a rolling chuck for positioning radially the pipe fitting, and a fixed clamping disc 51 close to the second chuck 4 for positioning axially and radially the pipe fitting and a rolling clamping disc 52 away from the second chuck 4 for positioning radially the pipe fitting are arranged on the third chuck 5 at both ends.

It needs to be explained that structures of the first chuck 3 and the second chuck 4 in the embodiment are well known by the persons skilled in the art and are not limited herein, as long as fixed clamping and rolling clamping on a pipe fitting are able to be achieved.

The third chuck 5 in the embodiment integrates both fixed clamping function and rolling clamping function which reduces the length of the lathe bed 2 as much as possible, and during pipe cutting, the second chuck 4 and the third chuck 5 can continuously provide three-point supporting, thus providing larger supporting weight and higher supporting precision, so that higher efficiency and precision are achieved when a long and thin pipe fitting is cut.

The third chuck (5) in the embodiment further includes a mounting base 53 which is in sliding connection with the lathe bed 2, a first mounting disc 54 and a second mounting disc 55 which are rotationally arranged at both ends of the mounting base 53 respectively, wherein the first mounting disc 54 on which the fixed clamping disc 51 is arranged is connected fixedly to the second mounting disc 55 on which the rolling clamping disc 52 is arranged, and the third chuck 5 further includes a first driving structure 56 connected with the first mounting disc 54 and for driving the first mounting disc 54 to rotate. The first driving structure 56 is used for driving the first mounting disc 54 to rotate around the axis thereof, meanwhile, since the first mounting disc 54 is fixedly connected to the second mounting disc 55, the second mounting disc 55 rotates along with the first mounting disc 54, so that the fixed clamping disc 51 and the rolling clamping disc 52 clamping the pipe fitting are driven to rotate, and accordingly, a patterning cutting is made on the pipe fitting or the pipe fitting is cut off.

To ensure the cutting precision of the pipe fitting, the first mounting disc 54, the second mounting disc 55, the first chuck 3, the second chuck 4, the fixed clamping disc 51 and the rolling clamping disc 52 in the embodiment are coaxially arranged so that the pipe fitting can still be kept linear under clamping of the first chuck 3, the second chuck 4 and the third chuck 5, the pipe fitting cannot jump during high-speed rotation around the axis thereof, and accordingly, the cutting precision is guaranteed; and pipe fitting bend can be corrected at the same time.

The fixed clamping disc 51 in the embodiment includes four first clamping jaws 511 evenly distributed in the circumferential direction of the first mounting disc 54 and arranged on the first mounting disc 54 radially in a sliding manner, and a second driving structure connected with the respective first clamping jaws 511, and clamping planes are arranged at the ends, close to the rotating axis of the first mounting disc 54, of the first clamping jaws 511; and the rolling clamping disc 52 includes four second clamping jaws 521 which are evenly distributed in the circumferential direction of the second mounting disc 55 and arranged on the second mounting disc 55 radially in a sliding manner, and a third driving structure connected with the second clamping jaws 521, and rolling shafts 522 are rotationally arranged at the ends, namely the mesial ends, close to the axis of the second mounting disc 55, of the second clamping jaws 521. Specifically, to achieve a stable clamping function, the first clamping jaws 511 and the second clamping jaws 521 are respectively and symmetrically distributed on the end faces of the first mounting disc 54 or the second mounting disc 55, and a distance is formed between the approaching ends, namely the mesial ends of the four first clamping jaws 511 and the four second clamping jaws 521 for passing pipe fitting conveniently. In operation, the mesial ends, namely the ends close to the rotating axis of the first mounting disc 54, of the first clamping jaws 511 are tightly connected with the side wall of the pipe fitting and rub with the pipe fitting so that the pipe fitting can be positioned radially and axially. The side walls of the rolling shafts 522 on the second clamping jaws 521 make contact with the side wall of the pipe fitting, and the second clamping jaws 521 can limit the radial movement of the pipe fitting, since the second clamping jaws 521 are symmetrically distributed on the side faces of the pipe fitting. While a sliding connection is formed between the rolling shafts 522 on the second clamping jaws 521 and the pipe fitting, and when the pipe fitting moves in the axial direction thereof, the rolling shafts 522 are driven to rotate, and therefore the second clamping jaws 521 cannot limit the axial movement of the pipe fitting.

The third chuck 5 in the embodiment further includes a second driving structure connected with the first clamping jaws 511 and for driving the first clamping jaws 511 to move in the radial direction of the first mounting disc 54, and a third driving structure connected with the second clamping jaws 521 and for driving the second clamping jaws 521 to move in the radial direction of the second mounting disc 55. The first clamping jaws 511 or the second clamping jaws 521 are driven by the two driving structures respectively so that the fixed clamping disc 51 and the rolling clamping disc 52 in the third chuck 5 can independently achieve clamping or loosening control. Accordingly, when a patterning cutting can be made on the pipe fitting between the third chuck 5 and the second chuck 4, the first chuck 3 can clamp the pipe fitting to provide the feeding movement, the fixed clamping disc 51 on the third chuck 5 is loosened so as not to hinder the axial movement of the pipe fitting, while the rolling clamping disc 52 on the third chuck 5 positions radially the pipe fitting to provide support for the pipe fitting; and when the remaining length of the pipe fitting is short, the fixed clamping disc 51 on the third chuck 5 can directly clamp the pipe fitting to provide the feeding movement, and the rolling clamping disc 52 provides radial support at the same time to make a patterning cutting or cutting-off of tailings, and accordingly achieve offside cutting, zero tailing and automatic discharging. It needs to be explained that the second driving structure and the third driving structure in the embodiment can adopt chuck structures commonly used by the persons skilled in the art, and limitation is not made as long as independent driving on the clamping jaws can be achieved.

To prevent slip between the side wall of the pipe fitting and the first clamping jaw 511 during pipe fitting clamping from influencing cutting precision, the ends, close to the axis of the first mounting disc 54, of the first clamping jaws 511 in the embodiment are provided with anti-skid structures 512. Specifically, the anti-skid structures 512 can be a plurality of grooves or protrusions arranged on the end faces of the first clamping jaws 511 to increase friction force between the first clamping jaws 511 and the pipe fitting.

The lathe bed 2 in the embodiment is provided with a guide rail 21 in the length direction thereof, and the first chuck 3, the second chuck 4 and the mounting base 53 are all in sliding connection with the guide rail 21. As such, the first chuck 3, the second chuck 4 and the third chuck 5 can slide on the lathe bed 2 along the guide rail 21 so as to change the supporting position of the pipe fitting or drive the pipe fitting to move in the length direction of the lathe bed 2, achieve feeding, and cut out corresponding patterns on the pipe fitting.

Since pipe diameters in multi-time pipe cutting may be inconsistent during the practical pipe cutting operation, to ensure the proper distance between the cutting head 1 and the side wall of the pipe fitting, the cutting head 1 in the embodiment is connected with a fourth driving structure 6 for driving the cutting head 1 to move in the direction perpendicular to the length direction of the guide rail 21 in a vertical plane, and a fifth driving structure 7 for driving the cutting head 1 to move in the direction perpendicular to the length direction of the guide rail 21 in a horizontal plane. Specifically, the lathe bed 2 is provided with a cross beam perpendicular and horizontal to the guide rail 21, the cross beam is in sliding connection with the lathe bed 2, and is further vertically and fixedly connected with a vertical beam on which the cutting head 1 is arranged. The fourth driving structure 6 and the fifth driving structure 7 can be drive motors matched with the gear and rack or be drive motors matched with ball screws so as to drive the vertical beam to move up and down or the cross beam to move horizontally, and accordingly the position of the cutting head 1 is changed to adapt to the cutting requirements of pipe fittings with different pipe diameters. It is worthy of being explained that the types of the fourth driving structure 6 and the fifth driving structure 7 are not limited, the scheme in the embodiment can be adopted in the specific implementing process. Of course, other types of driving manners can be adopted so as to adjust the position of the cutting head 1, which is the technology content well known by the persons skilled in the art and is not explained in detail herein.

The third chuck 5 in the embodiment further includes a sixth driving structure 8 arranged on the mounting base 53 and for driving the third chuck 5 to slide in the length direction of the guide rail 21. Specifically, the sixth driving structure 8 includes a rack 81 fixedly arranged on the lathe bed 2 and parallel to the guide rail 21 and a drive motor 82 fixedly arranged on the mounting base 53, and an output shaft of the drive motor 82 is fixedly mounted with a gear 83 meshing with the rack 81. As such, the drive motor 82 can rotate to drive the gear 83 to be mesh with the rack 81, and accordingly, the third chuck 5 fixedly connected with the drive motor 82 is driven to slide in the guide rail 21 so as to change the position of the third chuck 5 in the lathe bed 2 to adapt to cutting of pipe fittings with various lengths and achieve an automatic blanking function of pipe fitting cutting.

The operating process of the embodiment is as follows: when the cutting head 1 is located between the first chuck 3 and the second chuck 4, the fixed clamping disc 51 in the third chuck 5 clamps the pipe fitting so as to provide the feeding movement of the fed pipe fitting, the second chuck 4 and the rolling clamping discs 52 in the third chuck 5 support the pipe fitting in the radial direction, a patterning cutting or cutting-off of pipe fitting tailings is made, to achieve complete zero-tailing and no-dead-angle offside cutting, and achieve automatic discharging and long discharging through a fixed clamping function of the third chuck 5; in addition, since the first chuck 3 and the third chuck 5 both have the fixed clamping function, feeding and discharging operation can be conducted at the same time, to improve the overall work efficiency; and meanwhile, three points actually support the pipe fitting during the cutting process so that the supporting strength and the cutting precision can be guaranteed.

When the cutting head 1 is located between the second chuck 4 and the third chuck 5, the fixed clamping disc 51 in the first chuck 3 or the third chuck 5 clamps the pipe fitting so as to provide the feeding movement, and the rolling clamping discs 52 in the second chuck 4 and the third chuck 5 position radially the pipe fitting.

When the length of the pipe fitting is smaller than the sum of the axial thicknesses of the second chuck 4 and the third chuck 5, or when the cutting head 1 is located on the side, away from the second chuck 4, of the third chuck 5, the fixed clamping disc 51 in the third chuck 5 clamps the pipe fitting so as to provide the feeding movement, the fixed clamping disc 51 in the third chuck 5 limits the pipe fitting in the radial direction, and meanwhile the second chuck 4 can also limit the pipe fitting in the radial direction so as to ensure that the pipe fitting rotates around the axis thereof.

When the length of the pipe fitting is slightly larger than the axial thickness of the second chuck 4 or the third chuck 5, since the third chuck 5 has the fixed clamping function and rolling clamping function at the same time, the third chuck 5 can be directly used for clamping the pipe fitting for patterning cutting or cutting-off, and accordingly zero-tailing cutting can be achieved.

Thereby, the laser pipe cutting device in the embodiment can achieve no-dead-angle cutting of the whole lathe bed, provide in real time three supporting points during cutting, improve the clamping precision while guarantee the supporting strength, have higher advantages in long and thin pipe cutting, conduct simultaneous feeding and discharging, and have a higher cutting efficiency.

The embodiment can keep three-position supporting on the pipe fitting under various cutting operating conditions to achieve larger supporting weight, achieve good support for long material cutting as well, and guarantee the cutting precision; and in addition, the fixed clamping disc 51 in the third chuck 5 similarly can conduct fixed clamping on the pipe fitting, and therefore when the length of tailings is short, the third chuck 5 can clamp the tailings for patterning cutting or cutting off, and accordingly no-dead-angle and zero-tailing cutting is achieved.

In the description of the specification, descriptions of reference terms "one embodiment", "some embodiments", "example", "specific example" or "some examples" or the like imply that specific features, structures, materials or characteristics described in combination with the embodiment or the example are included in at least one embodiment or example of the present invention. In the specification, schematic statements of the above terms are not necessarily specific to the same embodiment or example. Moreover, the described specific features, structures, materials or characteristics can be combined in a suitable manner in any one or more embodiments or examples. In addition, the persons skilled in the art can combine the different embodiments or examples described in the specification and the features of the different embodiments or examples without mutual contradiction.

Although the embodiment of the present invention is shown and described above, it can be understood that the above embodiment is illustrative and cannot be understood as limitation on the present invention, and the persons skilled in the art can change, modify, replace and transform the above embodiment within the range of the present invention.

Obviously, the embodiment of the present invention is only an example for clearly explaining the present invention but not a limitation of the implementations of the present invention. The persons skilled in the art can make other different forms of changes or variations on the basis of the above descriptions. It is unnecessary and impossible to enumerate all the implementations here. Any modification, equivalent replacement, improvement and the like made within the spirit and principle of the present invention shall fall within the scope of protection of the claims of the present invention.

The invention claimed is:

1. A laser pipe cutting device, comprising a cutting head (1), a lathe bed (2), a first chuck (3), a second chuck (4) and a third chuck (5) that are sequentially arranged on the lathe bed (2) in a sliding manner, and the cutting head (1) is in sliding connection with the lathe bed (2); wherein the first chuck (3) is a fixed chuck for positioning a pipe fitting axially and radially, the second chuck (4) is a rolling chuck for positioning radially the pipe fitting, and a fixed clamping disc (51) close to the second chuck (4) for positioning axially and radially the pipe fitting and a rolling clamping disc (52) away from the second chuck (4) for positioning radially the pipe fitting are arranged on the third chuck (5) at both ends, the third chuck (5) further comprises a mounting base (53) which is in sliding connection with the lathe bed (2), a first mounting disc (54) and a second mounting disc (55) which are rotationally arranged at both ends of the mounting base (53) respectively, wherein the first mounting disc (54) on which the fixed clamping disc (51) is arranged is connected fixedly to the second mounting disc (55) on which the rolling clamping disc (52) is arranged, and the third chuck (5) further comprises a first driving structure (56) connected with and for driving the first mounting disc (54) or the second mounting disc (55) to rotate, the fixed clamping disc (51) comprises at least two first clamping jaws (511) which are evenly distributed in the circumferential direction of the first mounting disc (54) and arranged on the first mounting disc (54) radially in a sliding manner, and clamping planes are arranged at the ends, close to the rotating axis of the first mounting disc (54), of the first clamping jaws (511); and the rolling clamping disc (52) comprises at least two second clamping jaws (521) which are evenly distributed in the circumferential direction of the second mounting disc (55) and mounted on the second mounting disc (55) radially in a sliding manner, and rolling shafts (522) are rotationally arranged at the ends, close to the axis of the second mounting disc (55), of the second clamping jaws (521); and a guide rail (21) in sliding connection with the first chuck (3), the second chuck (4) and the mounting base (53) is arranged on the lathe bed (2) along its length direction.

2. The laser pipe cutting device according to claim 1, wherein the first mounting disc (54), the second mounting disc (55), the first chuck (3), the second chuck (4), the fixed clamping disc (51) and the rolling clamping disc (52) are coaxially arranged.

3. The laser pipe cutting device according to claim 1, wherein the rotating axis of each rolling shaft (522) is perpendicular to the axis of the second mounting disc (55).

4. The laser pipe cutting device according to claim 1, wherein each clamping plane is covered with an anti-skid structure (512).

5. The laser pipe cutting device according to claim 1, wherein the cutting head (1) is connected with a fourth driving structure (6) for driving the cutting head (1) to move in the direction perpendicular to the length direction of the guide rail (21) in a vertical plane, and a fifth driving structure (7) for driving the cutting head (1) to move in the direction perpendicular to the length direction of the guide rail (21) in a horizontal plane.

6. The laser pipe cutting device according to claim 2, wherein the cutting head (1) is connected with a fourth driving structure (6) for driving the cutting head (1) to move in the direction perpendicular to the length direction of the guide rail (21) in a vertical plane, and a fifth driving structure (7) for driving the cutting head (1) to move in the direction perpendicular to the length direction of the guide rail (21) in a horizontal plane.

7. The laser pipe cutting device according to claim 3, wherein the cutting head (1) is connected with a fourth driving structure (6) for driving the cutting head (1) to move in the direction perpendicular to the length direction of the guide rail (21) in a vertical plane, and a fifth driving structure (7) for driving the cutting head (1) to move in the direction perpendicular to the length direction of the guide rail (21) in a horizontal plane.

8. The laser pipe cutting device according to claim 4, wherein the cutting head (1) is connected with a fourth driving structure (6) for driving the cutting head (1) to move in the direction perpendicular to the length direction of the guide rail (21) in a vertical plane, and a fifth driving structure (7) for driving the cutting head (1) to move in the direction perpendicular to the length direction of the guide rail (21) in a horizontal plane.

9. The laser pipe cutting device according to claim 5, wherein the third chuck (5) further comprises a sixth driving structure (8) arranged on the mounting base (53) and for driving the third chuck (5) to slide in the length direction of the guide rail (21).

10. The laser pipe cutting device according to claim 6, wherein the third chuck (5) further comprises a sixth driving structure (8) arranged on the mounting base (53) and for driving the third chuck (5) to slide in the length direction of the guide rail (21).

11. The laser pipe cutting device according to claim 7, wherein the third chuck (5) further comprises a sixth driving structure (8) arranged on the mounting base (53) and for driving the third chuck (5) to slide in the length direction of the guide rail (21).

12. The laser pipe cutting device according to claim 8, wherein the third chuck (5) further comprises a sixth driving structure (8) arranged on the mounting base (53) and for driving the third chuck (5) to slide in the length direction of the guide rail (21).

13. The laser pipe cutting device according to claim 9, wherein the sixth driving structure (8) comprises a rack (81) fixedly arranged on the lathe bed (2) and parallel to the guide rail (21) and a drive motor (82) fixedly arranged on the mounting base (53), and an output shaft of the drive motor (82) is fixedly mounted with a gear (83) meshing with the rack (81).

14. The laser pipe cutting device according to claim 10, wherein the sixth driving structure (8) comprises a rack (81) fixedly arranged on the lathe bed (2) and parallel to the guide rail (21) and a drive motor (82) fixedly arranged on the mounting base (53), and an output shaft of the drive motor (82) is fixedly mounted with a gear (83) meshing with the rack (81).

15. The laser pipe cutting device according to claim 11, wherein the sixth driving structure (8) comprises a rack (81) fixedly arranged on the lathe bed (2) and parallel to the guide rail (21) and a drive motor (82) fixedly arranged on the mounting base (53), and an output shaft of the drive motor (82) is fixedly mounted with a gear (83) meshing with the rack (81).

16. The laser pipe cutting device according to claim 12, wherein the sixth driving structure (8) comprises a rack (81) fixedly arranged on the lathe bed (2) and parallel to the guide rail (21) and a drive motor (82) fixedly arranged on the mounting base (53), and an output shaft of the drive motor (82) is fixedly mounted with a gear (83) meshing with the rack (81).

\* \* \* \* \*